United States Patent
Noguchi et al.

(10) Patent No.: US 10,961,353 B2
(45) Date of Patent: Mar. 30, 2021

(54) POLYMER, COMPOSITION, AND MOLDED ARTICLE

(71) Applicants: DAIKIN INDUSTRIES, LTD., Osaka (JP); NIHON UNIVERSITY, Tokyo (JP)

(72) Inventors: Tsuyoshi Noguchi, Osaka (JP); Fumihiro Kamiya, Osaka (JP); Tadashi Kanbara, Osaka (JP); Nobukatsu Nemoto, Tokyo (JP)

(73) Assignees: DAIKIN INDUSTRIES, LTD., Osaka (JP); NIHON UNIVERSITY, Tokyo (JP)

( * ) Notice: Subject to any disclaimer, the term of this patent is extended or adjusted under 35 U.S.C. 154(b) by 3 days.

(21) Appl. No.: 16/461,090

(22) PCT Filed: Dec. 8, 2017

(86) PCT No.: PCT/JP2017/044118
§ 371 (c)(1),
(2) Date: May 15, 2019

(87) PCT Pub. No.: WO2018/105716
PCT Pub. Date: Jun. 14, 2018

(65) Prior Publication Data
US 2020/0055993 A1 Feb. 20, 2020

(30) Foreign Application Priority Data

Dec. 9, 2016 (JP) ............................. JP2016-239356

(51) Int. Cl.
| C08G 77/52 | (2006.01) |
| C08L 27/18 | (2006.01) |
| C09K 3/10 | (2006.01) |

(52) U.S. Cl.
CPC .............. *C08G 77/52* (2013.01); *C08L 27/18* (2013.01); *C09K 3/1009* (2013.01); *C09K 3/1018* (2013.01)

(58) Field of Classification Search
None
See application file for complete search history.

(56) References Cited

U.S. PATENT DOCUMENTS

| 3,105,085 | A | * | 9/1963 | Toporcer | C07F 7/1804 |
| | | | | | 556/431 |
| 3,117,149 | A | * | 1/1964 | Holdstock | C08G 77/52 |
| | | | | | 556/433 |
| 3,209,018 | A | * | 9/1965 | Merker | C07F 7/0834 |
| | | | | | 556/432 |
| 3,274,153 | A | * | 9/1966 | Hyde | C08G 77/00 |
| | | | | | 528/23 |
| 3,280,073 | A | * | 10/1966 | Chaffee | C08G 77/52 |
| | | | | | 528/32 |
| 3,338,870 | A | | 8/1967 | Nitzsche et al. | |
| 3,576,021 | A | * | 4/1971 | Grindahl | C10M 3/00 |
| | | | | | 556/432 |
| 4,470,831 | A | * | 9/1984 | Hirose | B01D 69/12 |
| | | | | | 428/391 |
| 4,990,546 | A | * | 2/1991 | Eckberg | C08G 77/50 |
| | | | | | 522/170 |
| 5,346,980 | A | * | 9/1994 | Babu | C08G 77/52 |
| | | | | | 528/32 |
| 7,323,250 | B2 | * | 1/2008 | Tabei | C08L 83/04 |
| | | | | | 428/447 |
| 2006/0235140 | A1 | | 10/2006 | Tanaka et al. | |
| 2016/0347895 | A1 | | 12/2016 | Morikawa et al. | |

FOREIGN PATENT DOCUMENTS

| CN | 1777644 A | 5/2006 |
| CN | 105980415 A | 9/2016 |
| JP | 2015-231668 A | 12/2015 |
| WO | 2014/050833 A1 | 4/2014 |

OTHER PUBLICATIONS

Nemoto et al. (Synthesis and Charactersization of Poly(tetramethyl-1,4-silphenylenesiloxane) Derivatives with Oxyethylene Substituent on Phenylene Moiety) Polymer Bulletin, 2006, 57, 661-670. (Year: 2006).*

Yoshinori Niwa, et al., "Synthesis and Thermal Characterization of Novel Poly(tetramethyl-1, 3-silphenylenesiloxane) Derivative with Phenol Moiety in the Main Chain", Journal of Polymer Science, 2008, pp. 692-701, vol. 46, No. 2.

International Search Report for PCT/JP2017/044118 dated Mar. 13, 2018 [PCT/ISA/210].

(Continued)

*Primary Examiner* — Robert S Loewe
(74) *Attorney, Agent, or Firm* — Sughrue Mion, PLLC

(57) ABSTRACT

The invention provides a novel polymer, a composition, and a molded article. The polymer contains a constitutional unit represented by the following formula (1):

[Chem. 1]

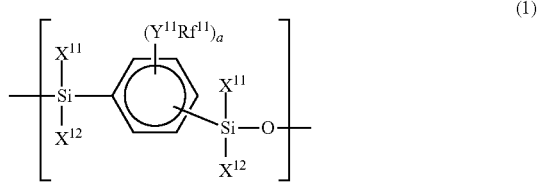

(1)

wherein $X^{11}$ and $X^{12}$ are the same as or different from each other, and are each a hydrogen atom, an alkyl group optionally containing a fluorine atom, or a phenyl group; $Y^{11}$ is an oxygen atom or a sulfur atom; $Rf^{11}$ is a hydrogen atom or an alkyl group optionally containing a fluorine atom; and a is an integer of 1 to 4.

16 Claims, No Drawings

(56) References Cited

OTHER PUBLICATIONS

Extended European Search Report dated Apr. 29, 2020, from the European Patent Office in Application No. 17878565.5.
International Preliminary Report on Patentability with English Translation of Written Opinion of the International Searching Authority for PCT/JP2017/044118 dated Jun. 11, 2019.

* cited by examiner

POLYMER, COMPOSITION, AND MOLDED ARTICLE

CROSS REFERENCE TO RELATED APPLICATIONS

This application is a National Stage of International Application No. PCT/JP2017/044118 filed Dec. 8, 2017, claiming priority based on Japanese Patent Application No. 2016-239356 filed Dec. 9, 2016.

TECHNICAL FIELD

The invention relates to polymers, compositions, and molded articles.

BACKGROUND ART

The field of semiconductor manufacturing has a year-by-year increasing demand for further die shrink and higher integration of semiconductors. O-rings for semiconductor manufacturing devices also have an increasing demand for elimination of foreign substances that may cause process errors. In particular, filler (mainly, silica), which is a constituent material of O-rings, itself is found to be foreign substances to cause process errors when the O-rings are deteriorated. This creates a demand for an alternative material for filler that has functions of both exerting mechanical properties and protecting a base polymer from oxygen-based plasma.

SUMMARY OF INVENTION

Technical Problem

The invention is made in view of the above current state of the art, and aims to provide a novel polymer, a composition, and a molded article.

Solution to Problem

The invention relates to a polymer containing a constitutional unit represented by the following formula (1):

[Chem. 1]

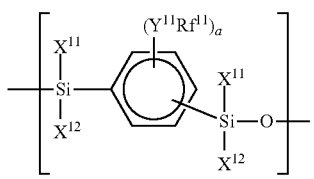

wherein $X^{11}$ and $X^{12}$ are the same as or different from each other, and are each a hydrogen atom, an alkyl group optionally containing a fluorine atom, or a phenyl group; $Y^{11}$ is an oxygen atom or a sulfur atom; $Rf^{11}$ is a hydrogen atom or an alkyl group optionally containing a fluorine atom; and a is an integer of 1 to 4.

The polymer preferably satisfies that in the formula (1), a first Si binding to a benzene ring is present at a para position relative to a second Si.

The polymer preferably has a number average molecular weight of $0.5 \times 10^3$ to $1.0 \times 10^7$.

The invention also relates to a composition containing a fluorine-containing polymer and the above polymer.

The fluorine-containing polymer is preferably a fluorine-containing elastomer.

The fluorine-containing elastomer is preferably a perfluoroelastomer containing TFE.

Preferably, the perfluoroelastomer containing TFE is at least one selected from the group consisting of a copolymer of TFE and a fluoromonomer represented by the following formula (8), (10), or (11) and a copolymer of TFE, a fluoromonomer represented by the following formula (8), (10), or (11), and a monomer giving a crosslinking site, the formula (8) is $CF_2=CF-ORf^{81}$, wherein $Rf^{81}$ is a C1-C8 perfluoroalkyl group, the formula (10) is $CF_2=CFOCF_2ORf^{101}$, wherein $Rf^{101}$ is a C1-C6 linear or branched perfluoroalkyl group, a C5-C6 cyclic perfluoroalkyl group, or a C2-C6 linear or branched perfluorooxyalkyl group containing 1 to 3 oxygen atoms; and the formula (11) is $CF_2=CFO(CF_2CF(Y^{111})O)_m(CF_2)_nF$, wherein $Y^{111}$ is a fluorine atom or a trifluoromethyl group; m is an integer of 1 to 4; and n is an integer of 1 to 4.

In the perfluoroelastomer containing TFE, TFE preferably represents 45 mol % or more of all monomers.

The fluorine-containing polymer preferably contains a cyano group.

The composition preferably contains 0.5 to 100 parts by mass of the polymer relative to 100 parts by mass of the fluorine-containing polymer.

The composition is preferably a molding material.

The invention also relates to a molded article obtainable from the above composition.

The molded article is preferably a seal.

The molded article is also preferably a seal for a semiconductor manufacturing device.

Advantageous Effects of Invention

The invention can provide a novel polymer, a composition, and a molded article.

DESCRIPTION OF EMBODIMENTS

The invention will be specifically described hereinbelow.

The invention relates to a novel polymer containing a constitutional unit represented by the following formula (1):

[Chem. 2]

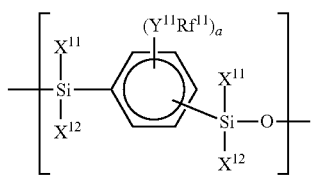

wherein $X^{11}$ and $X^{12}$ are the same as or different from each other, and are each a hydrogen atom, an alkyl group optionally containing a fluorine atom, or a phenyl group; $Y^{11}$ is an oxygen atom or a sulfur atom; $Rf^{11}$ is a hydrogen atom or an alkyl group optionally containing a fluorine atom; and a is an integer of 1 to 4.

The presence of a side chain represented by $Rf^{11}$ in the polymer of the invention leads to high affinity with a fluorine-containing polymer. The presence of a Si—O bond leads to oxygen plasma resistance. The polymer of the invention has a structure in which these moieties are linked via a benzene ring. Thus, when added to a fluorine-containing polymer (base polymer), the polymer of the invention can exert mechanical properties and oxygen plasma resistance without impairing the affinity with such a fluorine-containing polymer.

In the formula (1), $X^{11}$ and $X^{12}$ are the same as or different from each other, and are each a hydrogen atom, an alkyl group optionally containing a fluorine atom, or a phenyl group. $X^{11}$ and $X^{12}$ may be the same as or different from each other, and the two $X^{11}$s may be the same as or different from each other and the two $X^{12}$s may be the same as or different from each other. Examples of the alkyl group optionally containing a fluorine atom include C1-C8 alkyl and fluoroalkyl groups. The number of carbon atoms is preferably 3 or smaller. Specific examples of the alkyl group optionally containing a fluorine atom include —$CH_3$ and —$CH_2CH_2CF_3$. $X^{11}$ and $X^{12}$ are each preferably a hydrogen atom, —$CH_3$, —$CH_2CH_2CF_3$, or a phenyl group (-Ph).

In the formula (1), $Y^{11}$ is an oxygen atom or a sulfur atom. When multiple $Y^{11}$s are present, they may be the same as or different from each other. $Y^{11}$ is preferably a sulfur atom.

In the formula (1), $Rf^{11}$ is a hydrogen atom or an alkyl group optionally containing a fluorine atom. When multiple $Rf^{11}$s are present, they may be the same as or different from each other. Examples of the alkyl group optionally containing a fluorine atom include C1-C12 alkyl and fluoroalkyl groups. The number of carbon atoms is preferably 4 or greater and 10 or smaller. Specific examples of the alkyl group optionally containing a fluorine atom include —$CH_3$, —$(CF_2)_nCF_3$ (wherein n is an integer of 0 or greater, preferably an integer of 0 to 7), —$(CH_2)_2(CF_2)_nCF_3$ (wherein n is an integer of 0 or greater, preferably an integer of 0 to 7), —$CH_2(CF_2)_nCF_3$ (wherein n is an integer of 0 or greater, preferably an integer of 0 to 7), —$CH_2(CF_2)_nH$ (wherein n is an integer of 0 or greater, preferably an integer of 0 to 8), and —$CF(CF_3)_2$. $Rf^{11}$ is preferably —$(CF_2)_nCF_3$ (wherein n is an integer of 0 or greater, preferably an integer of 0 to 7) or —$(CH_2)_2(CF_2)_nCF_3$ (wherein n is an integer of 0 or greater, preferably an integer of 0 to 7), more preferably —$(CF_2)_3CF_3$, —$(CF_2)_5CF_3$, —$(CH_2)_2(CF_2)_3CF_3$, or —$(CH_2)_2(CF_2)_5CF_3$.

In the formula (1), a is an integer of 1 to 4, preferably 1 or 2.

In the formula (1), the two Si atoms may bind to the benzene ring at any positions. Preferably, a first Si binds at the meta or para position, more preferably at the para position, relative to a second Si.

The constitutional unit represented by the formula (1) is preferably a constitutional unit represented by either of the following formulae (1-1) and (1-2):

[Chem. 3]

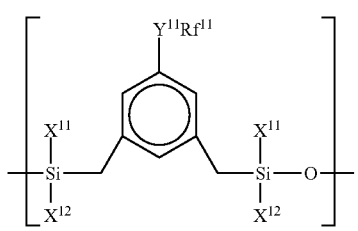

(1-1)

wherein $X^{11}$, $X^{12}$, $Y^{11}$, and $Rf^{11}$ are defined in the same manner as mentioned above;

[Chem. 4]

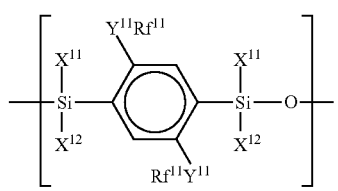

(1-2)

wherein $X^{11}$, $X^{12}$, $Y^{11}$, and $Rf^{11}$ are defined in the same manner as mentioned above.

The polymer of the invention preferably has a number average molecular weight of $0.5 \times 10^3$ to $1.0 \times 10^7$. The number average molecular weight is more preferably $0.8 \times 10^3$ or higher and $1.5 \times 10^6$ or lower, still more preferably $1.0 \times 10^6$ or lower.

The number average molecular weight can be determined by gel permeation chromatography analysis.

The polymer of the invention can be produced by condensation polymerizing a compound (2) represented by the following formula (2):

[Chem. 5]

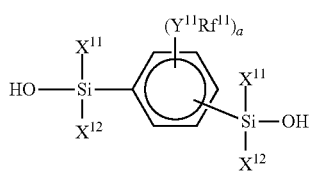

(2)

wherein $X^{11}$, $X^{12}$, $Y^{11}$, $Rf^{11}$, and a are defined in the same manner as mentioned above.

The condensation polymerization is preferably performed in the presence of a catalyst. Examples of the catalyst include 1,1,3,3-tetramethylguadinium-2-ethylhexanoate, amines (e.g., triethylamine, pyridine, DMAP, DBU, proton sponge, DABCO, quinuclidine, aniline, tributylamine, and ammonia), and acids soluble in an organic solvent (e.g., sulfuric acid, benzenesulfonic acid, p-toluenesulfonic acid, and trifluoromethanesulfonic acid).

The condensation polymerization is preferably performed in the presence of a solvent. Examples of the solvent include benzene, toluene, xylene, mesitylene, chlorobenzene, anisole, diisopropyl ether, dibutyl ether, cyclopentyl methyl ether, and diethylene glycol dimethyl ether.

The condensation polymerization may be performed at a temperature of 20° C. to 150° C.

Other conditions for the condensation polymerization may be set as appropriate based on known conditions for a dehydration condensation reaction of a silanol compound.

The polymer of the invention can be separated and purified by reprecipitation, for example.

The polymer of the invention may be a homopolymer of the compound (2) or may be a copolymer of the compound (2) and a different compound that is condensation-polymerizable with the compound (2). Examples of the different compound include disilanol compounds (other than the compound (2)) and polysiloxane compounds containing a terminal silanol group.

Compounds in which $Rf^{11}$ is $-(CF_2)_nCF_3$ (wherein n is an integer of 0 or greater) or $-(CH_2)_2(CF_2)_nCF_3$ (wherein n is an integer of 0 or greater) and $Y^{11}$ is a sulfur atom among the compounds (2) are novel compounds.

The compound (2) can be produced by oxidizing a compound (3) represented by the following formula (3):

[Chem. 6]

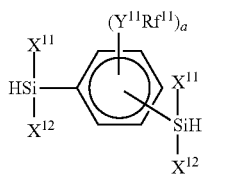

(3)

wherein $X^{11}$, $X^{12}$, $Y^{11}$, $Rf^{11}$, and a are defined in the same manner as mentioned above.

The oxidation reaction is preferably performed in the presence of a catalyst. Examples of the catalyst include palladium/carbon, palladium/alumina, platinum/carbon, platinum/alumina, ruthenium/carbon, ruthenium/alumina, rhodium/carbon, and rhodium/alumina.

The oxidation reaction is preferably performed in the presence of a solvent. Examples of the solvent include tetrahydrofuran (THF), 2-methyl tetrahydrofuran, diethyl ether, diisopropyl ether, dibutyl ether, monoglyme, diglyme, triglyme, tetraglyme, 1,4-dioxane, and diethylene glycol dimethyl ether.

The oxidation reaction may be performed at a temperature of −40° C. to 150° C.

Other conditions for the oxidation reaction may be set as appropriate based on known conditions for an oxidation reaction of a hydrosilane compound.

The compound (2) can be separated and purified by column chromatography or reprecipitation, for example.

Compounds in which $Rf^{11}$ is $-(CF_2)_nCF_3$ (wherein n is an integer of 0 or greater) or $-(CH_2)_2(CF_2)_nCF_3$ (wherein n is an integer of 0 or greater) and $Y^{11}$ is a sulfur atom among the compounds (3) are novel compounds.

The compound (3) can be produced by reacting a compound (4) represented by the following formula (4):

[Chem. 7]

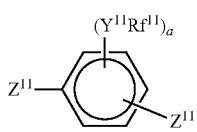

(4)

(wherein $Y^{11}$, $Rf^{11}$, and a are defined in the same manner as mentioned above; and $Z^{11}$s are the same as or different from each other, and are each a halogen atom), magnesium metal or zinc metal, and a compound (5) represented by the formula (5): $Z^{12}SiX^{11}X^{12}H$ (wherein $Z^{12}$ is a halogen atom; and $X^{11}$ and $X^{12}$ are defined in the same manner as mentioned above).

In the formula (4), $Z^{11}$s are the same as or different from each other, and are each a halogen atom. $Z^{11}$ is preferably a chlorine atom, a bromine atom, or an iodine atom, more preferably a bromine atom.

In the formula (5), $Z^{12}$ is a halogen atom. $Z^{12}$ is preferably a chlorine atom, a bromine atom, or an iodine atom, more preferably a chlorine atom.

In this reaction, magnesium metal or zinc metal is used. In particular, magnesium metal is preferably used.

The reaction of the compound (4), magnesium metal or zinc metal, and the compound (5) is preferably performed in the presence of a solvent. Examples of the solvent include tetrahydrofuran (THF), 2-methyl tetrahydrofuran, diethyl ether, diisopropyl ether, dibutyl ether, monoglyme, diglyme, triglyme, tetraglyme, and 1,4-dioxane.

The reaction may be performed at a temperature of −20° C. to 100° C.

Other conditions for the reaction may be set as appropriate based on known reaction conditions used by generating an organic metal regent.

The compound (3) can be separated and purified by column chromatography or reprecipitation, for example.

Compounds in which $Rf^{11}$ is $-(CF_2)_nCF_3$ (wherein n is an integer of 0 or greater) or $-(CH_2)_2(CF_2)_nCF_3$ (wherein n is an integer of 0 or greater) and $Y^{11}$ is a sulfur atom among the compounds (4) are novel compounds.

The compound (4) can be produced by combination of known reactions in accordance with its specific structure. The following shows some examples.

(Compound in which $Y^{11}$ is sulfur atom, $Rf^{11}$ is alkyl group optionally containing fluorine atom, and a is 1)

This compound may be produced by a method including:

a step (A-1) of reacting a compound (A-1) represented by the following formula (A-1):

[Chem. 8]

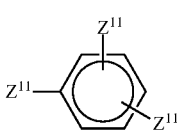

(A-1)

(wherein $Z^{11}$ is defined in the same manner as mentioned above) and carbon disulfide ($CS_2$), for example, to provide a compound (A-2) represented by the following formula (A-2):

[Chem. 9]

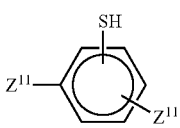

(A-2)

(wherein $Z^{11}$ is defined in the same manner as mentioned above); and a step (A-2) of reacting the compound (A-2) and a compound (a) represented by the formula (a): $Z^{13}$—$Rf^{11}$ (wherein $Z^{13}$ is a halogen atom; and $Rf^{11}$ is an alkyl group optionally containing a fluorine atom) in a basic condition to provide a compound (A-3) represented by the following formula (A-3):

[Chem. 10]

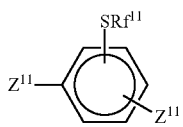

(A-3)

wherein $Z^{11}$ is defined in the same manner as mentioned above; and $Rf^{11}$ is an alkyl group optionally containing a fluorine atom.

In the formula (a), $Z^{13}$ is a halogen atom. $Z^{13}$ is preferably a chlorine atom, a bromine atom, or an iodine atom, more preferably an iodine atom.

The reaction in the step (A-1) may be performed under the conditions disclosed in JP 2000-7649 A, for example.

The reaction in the step (A-2) may be performed under the conditions disclosed in J. Mater. Chem. 6, 711-717 (1996), for example.

(Compound in which $Y^{11}$ is sulfur atom, $Rf^{11}$ is alkyl group optionally containing fluorine atom, and a is 2)

This compound may be produced by a method including a step (B-1) of reacting a compound (B-1) represented by the following formula (B-1):

[Chem. 11]

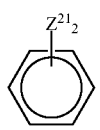

(B-1)

(wherein $Z^{21}$s are the same as or different from each other, and are each a halogen atom), i-PrSH (($CH_3$)$_2$CHSH), and sodium metal to provide a compound (B-2) represented by the following formula (B-2):

[Chem. 12]

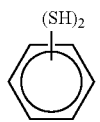

(B-2)

a step (B-2) of reacting the compound (B-2) and a compound (a) represented by the formula (a): $Z^{13}$—$Rf^{11}$, (wherein $Z^{13}$ is a halogen atom; and $Rf^{11}$ is an alkyl group optionally containing a fluorine atom) in a basic condition to provide a compound (B-3) represented by the following formula (B-3):

[Chem. 13]

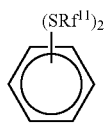

(B-3)

(wherein $Rf^{11}$ is an alkyl group optionally containing a fluorine atom); and a step (B-3) of reacting the compound (B-3) and a compound (b) represented by the formula (b): $Z^{11}{}_2$, (wherein $Z^{11}$ is defined in the same manner as mentioned above) to provide a compound (B-4) represented by the following formula (B-4):

[Chem. 14]

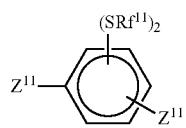

(B-4)

wherein $Z^{11}$ is defined in the same manner as mentioned above; and $Rf^{11}$ is an alkyl group optionally containing a fluorine atom.

In the formula (B-1), $Z^{21}$s are the same as or different from each other, and are each a halogen atom. $Z^{21}$ is preferably a chlorine atom, a bromine atom, or an iodine atom, more preferably a bromine atom.

The reaction in the step (B-1) may be performed under the conditions disclosed in Eur. J. Inorg. Chem. 35, 5328-5334 (2009), for example.

The reaction in the step (B-2) may be performed under the conditions disclosed in J. Mater. Chem. 6, 711-717 (1996), for example.

The reaction in the step (B-3) may be performed under the conditions disclosed in J. Phys. Chem. 117, 4442-4448 (2013), for example.

Compounds in which $Rf^{11}$ is —$(CF_2)_{n+1}CF_3$ (wherein n is an integer of 0 or greater) or —$(CH_2)_2(CF_2)_nCF_3$ (wherein n is an integer of 0 or greater) among the compounds (B-3) are novel compounds.

The invention also relates to a composition containing a fluorine-containing polymer and the aforementioned polymer of the invention. The composition of the invention has high affinity between the fluorine-containing polymer and the polymer, and has excellent mechanical properties and oxygen plasma resistance.

In order to achieve excellent sealability, chemical resistance, and heat resistance, the fluorine-containing polymer is preferably a fluorine-containing elastomer.

The fluorine-containing elastomer may be either a partially fluorinated elastomer or a perfluoroelastomer. In order to achieve better chemical resistance and heat resistance, a perfluoroelastomer is preferred.

Examples of the partially fluorinated elastomer include vinylidene fluoride (VdF) fluororubber, tetrafluoroethylene (TFE)/propylene (Pr) fluororubber, tetrafluoroethylene (TFE)/propylene/vinylidene fluoride (VdF) fluororubber, ethylene/hexafluoropropylene (HFP) fluororubber, ethylene/hexafluoropropylene (HFP)/vinylidene fluoride (VdF) fluororubber, and ethylene/hexafluoropropylene (HFP)/tetrafluoroethylene (TFE) fluororubber. Preferred is at least one selected from the group consisting of vinylidene fluoride fluororubber and tetrafluoroethylene/propylene fluororubber.

The vinylidene fluoride fluororubber is preferably a copolymer including 45 to 85 mol % of vinylidene fluoride and 55 to 15 mol % of at least one different monomer copolymerizable with vinylidene fluoride. It is preferably a copolymer including 50 to 80 mol % of vinylidene fluoride and 50 to 20 mol % of at least one different monomer copolymerizable with vinylidene fluoride.

In the present description, the amount of each monomer constituting the fluoropolymer can be calculated by any appropriate combination of NMR, FT-IR, elemental analysis, and X-ray fluorescence analysis in accordance with the type of the monomer.

Examples of the at least one different monomer copolymerizable with vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, fluoromonomers represented by the formula (6): $CH_2=CFRf^{61}$ (wherein $Rf^{61}$ is a C1-C12 linear or branched fluoroalkyl group), fluoromonomers represented by the formula (7): $CH_2=CH-(CF_2)_n-X^2$ (wherein $X^2$ is H or F; and n is an integer of 3 to 10), and monomers giving a crosslinking site; and non-fluorinated monomers such as ethylene, propylene, and alkyl vinyl ethers. These may be used alone or in any combination. Preferred among these is at least one selected from the group consisting of TFE, HFP, fluoroalkyl vinyl ethers, and CTFE.

The fluoroalkyl vinyl ethers preferably include at least one selected from the group consisting of:
fluoromonomers represented by the formula (8): $CF_2=CF-ORf^{81}$ (wherein $Rf^{81}$ is a C1-C8 perfluoroalkyl group);
fluoromonomers represented by the formula (10): $CF_2=CFOCF_2ORf^{101}$ (wherein $Rf^{101}$ is a C1-C6 linear or branched perfluoroalkyl group, a C5-C6 cyclic perfluoroalkyl group, or a C2-C6 linear or branched perfluorooxyalkyl group containing 1 to 3 oxygen atom(s)); and
fluoromonomers represented by the formula (11): $CF_2=CFO(CF_2CF(Y^{111})O)_m(CF_2)_nF$ (wherein $Y^{111}$ is a fluorine atom or a trifluoromethyl group; m is an integer of 1 to 4; and n is an integer of 1 to 4), and more preferably fluoromonomers represented by the formula (8).

Specific examples of the vinylidene fluoride fluororubber include VdF/HFP rubber, VdF/HFP/TFE rubber, VdF/CTFE rubber, VdF/CTFE/TFE rubber, rubber of VdF and a fluoromonomer represented by the formula (6), rubber of VdF, a fluoromonomer represented by the formula (6), and TFE, VdF/perfluoro(methyl vinyl ether) (PMVE) rubber, VdF/PMVE/TFE rubber, and VdF/PMVE/TFE/HFP rubber. The rubber of VdF and a fluoromonomer represented by the formula (6) is preferably VdF/$CH_2=CFCF_3$ rubber, and the rubber of VdF, a fluoromonomer represented by the formula (6), and TFE is preferably VdF/TFE/$CH_2=CFCF_3$ rubber.

The VdF/$CH_2=CFCF_3$ rubber is preferably a copolymer containing 40 to 99.5 mol % of VdF and 0.5 to 60 mol % of $CH_2=CFCF_3$, more preferably a copolymer containing 50 to 85 mol % of VdF and 15 to 50 mol % of $CH_2=CFCF_3$.

The tetrafluoroethylene/propylene fluororubber is preferably a copolymer containing 45 to 70 mol % of tetrafluoroethylene, 55 to 30 mol % of propylene, and 0 to 5 mol % of a fluoromonomer giving a crosslinking site.

The fluorine-containing elastomer may be a perfluoroelastomer. The perfluoroelastomer is preferably at least one selected from the group consisting of TFE-containing perfluoroelastomers, such as copolymers of TFE and a fluoromonomer represented by the formula (8), (10), or (11) and copolymers of TFE, a fluoromonomer represented by the formula (8), (10), or (11), and a monomer giving a crosslinking site. The composition thereof is preferably such that TFE represents 45 mol % or more of all monomers. The upper limit thereof is preferably 90 mol %.

In the case of a TFE/PMVE copolymer, the compositional ratio thereof is preferably (45 to 90)/(10 to 55) (mol %), more preferably (55 to 80)/(20 to 45), still more preferably (55 to 70)/(30 to 45).

In the case of a copolymer of TFE, PMVE, and a monomer giving a crosslinking site, the compositional ratio thereof is preferably (45 to 89.9)/(10 to 54.9)/(0.01 to 4) (mol %), more preferably (55 to 77.9)/(20 to 49.9)/(0.1 to 3.5), still more preferably (55 to 69.8)/(30 to 44.8)/(0.2 to 3).

In the case of a copolymer of TFE and a C4-C12 fluoromonomer represented by the formula (8), (10), or (11), the compositional ratio thereof is preferably (50 to 90)/(10 to 50) (mol %), more preferably (60 to 88)/(12 to 40), still more preferably (65 to 85)/(15 to 35).

In the case of a copolymer of TFE, a C4-C12 fluoromonomer represented by the formula (8), (10), or (11), and a monomer giving a crosslinking site, the compositional ratio thereof is preferably (50 to 89.9)/(10 to 49.9)/(0.01 to 4) (mol %), more preferably (60 to 87.9)/(12 to 39.9)/(0.1 to 3.5), still more preferably (65 to 84.8)/(15 to 34.8)/(0.2 to 3).

Copolymers having a compositional ratio outside the above range tend to lose the properties as a rubbery elastic body and to have properties similar to those of a resin.

In the perfluoroelastomer containing TFE, the monomer giving a crosslinking site is not necessarily a perfluoromonomer.

The perfluoroelastomer is preferably at least one selected from the group consisting of copolymers of TFE, a fluoromonomer represented by the formula (11), and a fluoromonomer giving a crosslinking site, copolymers of TFE and a perfluorovinyl ether represented by the formula (11), copolymers of TFE and a fluoromonomer represented by the formula (8), and copolymers of TFE, a fluoromonomer represented by the formula (8), and a monomer giving a crosslinking site.

The perfluoroelastomer may also be any of the perfluoroelastomers disclosed in patent documents such as WO 97/24381, JP S61-57324 B, JP H04-81608 B, and JP H05-13961 B.

The monomer giving a crosslinking site means a monomer (cure-site monomer) containing a crosslinkable group that gives a fluoropolymer a crosslinking site for forming crosslink by a cross-linking agent.

The monomer giving a crosslinking site is preferably at least one selected from the group consisting of:
fluoromonomers represented by the following formula (12):

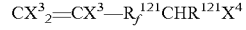

wherein $X^3$ is a hydrogen atom, a fluorine atom, or $CH_3$; $R_f^{121}$ is a fluoroalkylene group, a perfluoroalkylene group, a fluoro(poly)oxyalkylene group, or a perfluoro(poly)oxyalkylene group; $R^{121}$ is a hydrogen atom or $CH_3$; and $X^4$ is an iodine atom or a bromine atom;

fluoromonomers represented by the following formula (13):

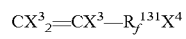

wherein $X^3$ is a hydrogen atom, a fluorine atom, or $CH_3$; $R_f^{131}$ is a fluoroalkylene group, a perfluoroalkylene group, a fluoropolyoxyalkylene group, or a perfluoropolyoxyalkylene group; and $X^4$ is an iodine atom or a bromine atom;

fluoromonomers represented by the following formula (14):

wherein m is an integer of 0 to 5; n is an integer of 1 to 3; and $X^5$ is a cyano group, a carboxy group, an alkoxycarbonyl group, an iodine atom, a bromine atom, or —$CH_2I$;

fluoromonomers represented by the following formula (15):

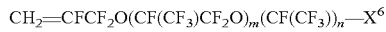

$$CH_2=CFCF_2O(CF(CF_3)CF_2O)_m(CF(CF_3))_n—X^6$$

wherein m is an integer of 0 to 5; n is an integer of 1 to 3; and $X^6$ is a cyano group, a carboxy group, an alkoxycarbonyl group, an iodine atom, a bromine atom, or —$CH_2OH$; and monomers represented by the following formula (16):

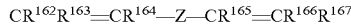

$$CR^{162}R^{163}=CR^{164}—Z—CR^{165}=CR^{166}R^{167}$$

wherein $R^{162}$, $R^{163}$, $R^{164}$, $R^{165}$, $R^{166}$, and $R^{167}$ are the same as or different from each other, and are each a hydrogen atom or a C1-C5 alkyl group; Z is a C1-C18 linear or branched alkylene group optionally containing an oxygen atom, a C3-C18 cycloalkylene group, a C1-C10 at least partially fluorinated alkylene or oxyalkylene group, or a (per)fluoropolyoxyalkylene group which is represented by -$(Q)_p$-$CF_2O$—$(CF_2CF_2O)_m(CF_2O)_n$—$CF_2$-$(Q)_p$- (wherein Q is an alkylene group or an oxyalkylene group; p is 0 or 1; and m/n is 0.2 to 5) and which has a molecular weight of 500 to 10000.

$X^3$ is preferably a fluorine atom. $Rf^{121}$ and $Rf^{131}$ are each preferably a C1-C5 perfluoroalkylene group. $R^{121}$ is preferably a hydrogen atom. $X^5$ is preferably a cyano group, an alkoxycarbonyl group, an iodine atom, a bromine atom, or —$CH_2I$. $X^6$ is preferably a cyano group, an alkoxycarbonyl group, an iodine atom, a bromine atom, or —$CH_2OH$.

The monomer giving a crosslinking site is preferably at least one selected from the group consisting of $CF_2=CFOCF_2CF(CF_3)OCF_2CF_2CN$, $CF_2=CFOCF_2CF(CF_3)OCF_2CF_2COOH$, $CF_2=CFOCF_2CF(CF_3)OCF_2CF_2CH_2I$, $CF_2=CFOCF_2CF_2CH_2I$, $CH_2=CFCF_2OCF(CF_3)CF_2OCF(CF_3)CN$, $CH_2=CFCF_2OCF(CF_3)CF_2OCF(CF_3)COOH$, $CH_2=CFCF_2OCF(CF_3)CF_2OCF(CF_3)CH_2OH$, $CH_2=CHCF_2CF_2I$, $CH_2=CH(CF_2)_2CH=CH_2$, $CH_2=CH(CF_2)_6CH=CH_2$, and $CF_2=CFO(CF_2)_5CN$, more preferably $CF_2=CFOCF_2CF(CF_3)OCF_2CF_2CN$.

The fluorine-containing polymer preferably contains a cyano group. The presence of a cyano group in the fluorine-containing polymer allows the polymer of the invention to favorably act as a cross-linking agent and can lead to a molded article having excellent heat resistance.

The cyano group can be introduced into the fluorine-containing polymer by the aforementioned monomer giving a crosslinking site. Alternatively, the cyano group may be introduced by the method disclosed in WO 00/05959.

The fluorine-containing polymer containing a cyano group preferably contains 0.1 to 5.0 mol %, more preferably 0.2 to 2.0 mol %, of the monomer giving a crosslinking site relative to all monomer units. In this case, the monomer giving a crosslinking site is preferably a monomer containing a cyano group.

In order to achieve excellent compression set performance at high temperature, the fluorine-containing elastomer preferably has a glass transition temperature of −70° C. or higher, more preferably −60° C. or higher, still more preferably −50° C. or higher. In order to achieve good cold resistance, the glass transition temperature is preferably 5° C. or lower, more preferably 0° C. or lower, still more preferably −3° C. or lower.

The glass transition temperature can be determined as follows. Specifically, using a differential scanning calorimeter, 10 mg of a sample is heated at a rate of 10° C./min to give a DSC curve, and the temperature is read at the intermediate point of two intersections between each of the extension lines of the base lines before and after the secondary transition of the DSC curve and the tangent line at the inflection point of the DSC curve.

In order to achieve good heat resistance, the fluorine-containing elastomer preferably has a Mooney viscosity ML(1+20) of 30 or higher, more preferably 40 or higher, still more preferably 50 or higher, at 170° C. In order to achieve good processability, this Mooney viscosity is preferably 150 or lower, more preferably 120 or lower, still more preferably 110 or lower.

In order to achieve good heat resistance, the fluorine-containing elastomer preferably has a Mooney viscosity ML(1+20) of 30 or higher, more preferably 40 or higher, still more preferably 50 or higher, at 140° C. In order to achieve good processability, this Mooney viscosity is preferably 180 or lower, more preferably 150 or lower, still more preferably 110 or lower.

In order to achieve good heat resistance, the fluorine-containing elastomer preferably has a Mooney viscosity ML(1+10) of 10 or higher, more preferably 20 or higher, still more preferably 30 or higher, at 100° C. In order to achieve good processability, this Mooney viscosity is preferably 120 or lower, more preferably 100 or lower, still more preferably 80 or lower.

The Mooney viscosity can be determined using a Mooney viscometer MV2000E available from Alpha Technologies Inc. at 170° C., 140° C., or 100° C. in conformity with JIS K6300.

The aforementioned partially fluorinated elastomer and perfluoroelastomer can be produced by a usual method. In order to make the molecular weight distribution of the resulting polymer narrow and control the molecular weight thereof easily, and to introduce an iodine atom or a bromine atom into an end, an iodine compound or a bromine compound may be used as a chain-transfer agent. An example of a polymerization method using an iodine compound or a bromine compound is a method in which emulsion polymerization is performed under pressure in an aqueous medium in the presence of an iodine compound or bromine compound substantially without oxygen (iodine transfer polymerization). Representative examples of the iodine compound or the bromine compound used include compounds represented by the following formula:

$$R^{13}I_xBr_y$$

(wherein x and y are each an integer of 0 to 2 and satisfy 1≤x+y≤2; and $R^{13}$ is a C1-C16 saturated or unsaturated fluorohydrocarbon or chlorofluorohydrocarbon group, or a C1-C3 hydrocarbon group, each of which optionally contains an oxygen atom). The presence of an iodine compound or a bromine compound enables introduction of an iodine atom or a bromine atom into the polymer, and such an atom may serve as a crosslinking site.

Examples of the iodine compound and the bromine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and monoiodomonobromo-substituted products of, diiodomonobromo-substituted products of, and (2-iodoethyl)- and (2-bromoethyl)-substituted products of benzene. These compounds may be used alone or in any combination.

In order to achieve good polymerization reactivity, good crosslinking reactivity, and easy availability, 1,4-diiodoperfluorobutane, 1,6-diiodoperfluorohexane, and 2-iodoperfluoropropane are preferred.

The composition preferably contains 0.5 to 100 parts by mass of the polymer of the invention relative to 100 parts by mass of the fluorine-containing polymer. The amount thereof is more preferably 5 to 50 parts by mass, still more preferably 5 to 25 parts by mass. Too small an amount of the polymer of the invention may exhibit poor reinforceability and oxygen plasma resistance, while too large an amount of the polymer of the invention may make the composition hard, causing poor sealability.

The composition may further contain a common cross-linking agent. Examples of the cross-linking agent include cross-linking agents to be used in any of peroxide cross-linking, polyol crosslinking, polyamine crosslinking, triazine crosslinking, oxazole crosslinking, imidazole crosslinking, and thiazole crosslinking.

Cross-linking agents to be used in peroxide crosslinking may be any organic peroxides that can easily generate peroxy radicals in the presence of heat or a redox system. Specific examples thereof include 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, 2,5-dimethyl-2,5-di(benzoylperoxy)hexane, t-butylperoxy maleate, t-butylperoxy isopropyl carbonate, and 1,3-bis(t-butylperoxyisopropyl)benzene. The type and amount of an organic peroxide are usually chosen in consideration of factors such as the amount of active —O—O— and the decomposition temperature.

Any crosslinking aid that is a compound reactive with peroxy radicals and polymer radicals may be used in this case. Examples thereof include multifunctional compounds containing functional groups such as $CH_2$=CH—, $CH_2$=$CHCH_2$—, and $CF_2$=CF—. Specific examples thereof include triallyl cyanurate, triallyl isocyanurate (TRIC), triacrylformal, triallyl trimellitate, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, and 1,6-divinyldodecafluorohexane.

Examples of cross-linking agents to be used in polyol crosslinking include polyhydric alcohol compounds such as bisphenol A and bisphenol AF.

Examples of cross-linking agents to be used in polyamine crosslinking include polyvalent amine compounds such as hexamethylenediamine carbamate, N,N'-dicinnamylidene-1,6-hexanediamine, and 4,4'-bis(aminocyclohexyl)methane carbamate.

Examples of cross-linking agents to be used in triazine crosslinking include organotin compounds such as tetraphenyltin and triphenyltin.

Examples of cross-linking agents to be used in any of oxazole crosslinking, imidazole crosslinking, and thiazole crosslinking include:

bisdiaminophenyl cross-linking agents, bisaminophenol cross-linking agents, and bisaminothiophenol cross-linking agents represented by the following formula (20):

[Chem. 15]

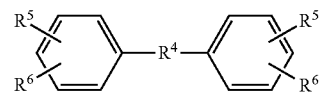

(20)

(wherein $R^4$ is —$SO_2$—, —O—, —CO—, a C1-C6 alkylene group, a C1-C10 perfluoroalkylene group, a single bond, or a group represented by the following formula:

[Chem. 16]

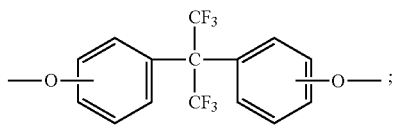

one of $R^5$ and $R^6$ is —$NH_2$ and the other is —$NHR^7$, —$NH_2$, —OH, or —SH; $R^7$ is a hydrogen atom, a fluorine atom, or a monovalent organic group, preferably $R^5$ is —$NH_2$ and $R^6$ is —$NHR^7$; the C1-C6 alkylene group may preferably specifically be a methylene group, an ethylene group, a propylene group, a butylene group, a pentylene group, a hexylene group, or the like, and the C1-C10 perfluoroalkylene group may be a group represented by the following formula:

[Chem. 17]

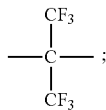

these compounds are known examples of bisdiaminophenyl compounds disclosed in, for example, JP H02-59177 B and JP H08-120146 A);

bisamidrazone cross-linking agents represented by the following formula (21):

[Chem. 18]

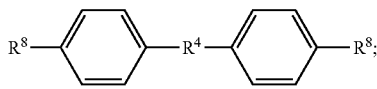

(21)

(wherein $R^4$ is defined in the same manner as mentioned above, and $R^8$ is 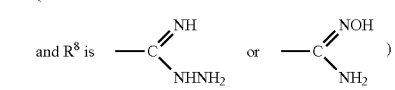 )

and bisamidooxime cross-linking agents represented by the following formula (22):

[Chem. 19]

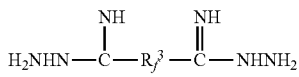

(22)

(wherein $R_f^3$ is a C1-C10 perfluoroalkylene group) or the following formula (23):

[Chem. 20]

(23)

(wherein n is an integer of 1 to 10). These bisaminophenol cross-linking agents, bisaminothiophenol cross-linking agents, and bisdiaminophenyl cross-linking agents are conventionally used for crosslinking systems where a cyano group serves as a crosslinking point. Further, they can also react with a carboxy group and an alkoxycarbonyl group and form an oxazole ring, thiazole ring, or imidazole ring, providing a crosslinked product.

Particularly preferred examples of the cross-linking agent include compounds containing multiple 3-amino-4-hydroxyphenyl groups or 3-amino-4-mercaptophenyl groups and compounds represented by the following formula (24):

[Chem. 21]

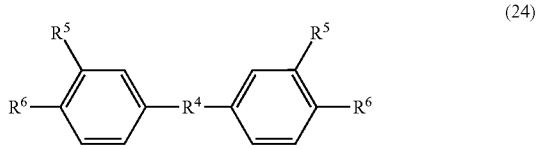

(24)

(wherein $R^4$, $R^5$, and $R^6$ are defined in the same manner as mentioned above). Specific examples thereof include 2,2-bis(3-amino-4-hydroxyphenyl)hexafluoropropane (common name: bis(aminophenol) AF), 2,2-bis(3-amino-4-mercaptophenyl)hexafluoropropane, tetraaminobenzene, bis-3,4-diaminophenylmethane, bis-3,4-diaminophenylether, 2,2-bis (3,4-diaminophenyl)hexafluoropropane, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl] hexafluoropropane, and 2,2-bis[3-amino-4-(N-benzylamino)phenyl]hexafluoropropane.

In order to achieve heat resistance, steam resistance, amine resistance, and good crosslinkability, the cross-linking agent is preferably 2,2-bis[3-amino-4-(N-phenylamino) phenyl]hexafluoropropane.

The common cross-linking agent is preferably present in an amount of 0.05 to 10 parts by mass, more preferably 0.5 to 5 parts by mass, relative to 100 parts by mass of the fluorine-containing polymer.

The composition may contain a common filler.

Examples of the common filler include imide fillers having an imide structure such as polyimide, polyamide-imide, and polyetherimide; organic fillers (excluding the compound (1)) made of engineering plastic such as polyarylate, polysulfone, polyethersulfone, polyphenylene sulfide, polyether ether ketone, polyether ketone, and polyoxybenzoate; metal oxide fillers such as aluminum oxide, silicon oxide, and yttrium oxide; metal carbides such as silicon carbide and aluminum carbide; metal nitride fillers such as silicon nitride and aluminum nitride; and inorganic fillers such as aluminum fluoride and carbon fluoride.

In order to achieve an effect of blocking a variety of plasma, preferred among these are aluminum oxide, yttrium oxide, silicon oxide, polyimide, and carbon fluoride.

The inorganic fillers and organic fillers may be used alone or in combination of two or more.

The amount of the common filler is preferably 0.5 to 100 parts by mass, more preferably 5 to 50 parts by mass, relative to 100 parts by mass of the fluorine-containing polymer. Still, inorganic filler may be foreign substances that may cause process errors in semiconductor manufacturing applications, and thus is preferably used in a small amount. The composition more preferably contains no inorganic filler.

In fields where high purity and non-staining properties are not required, common additives to be used in fluorine-containing polymer compositions as appropriate, such as fillers, processing aids, plasticizers, and colorants, may be blended with the composition, and one or more of common cross-linking agents and crosslinking aids different from those mentioned above may be blended with the composition.

The composition can be prepared by mixing the above components using a common polymer processing machine, such as an open roll mill, a Banbury mixer, or a kneader. The composition may alternatively be prepared using a closed-type mixer. The composition can be suitably used as a molding material to be molded into a molded article, and can be suitably used as a molding material to be crosslink-molded into a molded article.

The composition, when used as a molding material, may be formed into a preform by any usually known method, such as thermocompression in a mold, injection into a heated mold, or extrusion through an extruder. In production of an extruded article, such as a hose or an electric wire, the molded article can be produced by extrusion and subsequent heat crosslinking with steam, for example.

The crosslinking conditions are as follows.
(Standard Crosslinking Conditions)
Kneading method: roll kneading
Press crosslinking: 30 minutes at 180° C.
Oven crosslinking: 18 hours at 290° C.
Unless otherwise mentioned, crosslinking is performed under these conditions.

The invention also relates to a molded article obtainable from the above composition.

The molded article of the invention contains the aforementioned polymer of the invention, and thus has excellent mechanical properties. It also has excellent oxygen plasma resistance.

Accordingly, the molded article of the invention can suitably be used as a seal. In particular, the molded article of the invention can suitably be used as a seal for semiconductor manufacturing devices required to have mechanical properties and oxygen plasma resistance, especially semiconductor manufacturing devices. Examples of the seal include O-rings, square rings, gaskets, packings, oil seals, bearing seals, and lip seals.

The molded article may also be used as any of various polymer products for semiconductor manufacturing devices, such as diaphragms, tubes, hoses, various rubber rolls, and belts. The molded article may also be used as a material for coating or a material for lining.

The semiconductor manufacturing devices as used herein are not limited to devices for manufacturing semiconductors but widely include general manufacturing devices used in the semiconductor field required to have high cleanliness, such as devices for manufacturing liquid crystal panels or plasma panels. Examples thereof include the following.

(1) Etching Systems
   Dry etching systems
   Plasma etching systems
   Reactive ion etching systems
   Reactive ion beam etching systems
   Sputter etching systems
   Ion beam etching systems
   Wet etching systems
   Ashing systems
(2) Cleaning Systems
   Dry etching and cleaning systems
   $UV/O_3$ cleaning systems
   Ion beam cleaning systems
   Laser beam cleaning systems
   Plasma cleaning systems
   Gas etching and cleaning systems
   Extraction and cleaning systems
   Soxhlet extraction and cleaning systems
   High-temperature and high-pressure extraction and cleaning systems
   Microwave extraction and cleaning systems
   Supercritical extraction and cleaning systems
(3) Exposure Systems
   Steppers
   Coaters/developers
(4) Polishing Systems
   CMP systems
(5) Film Deposition Systems
   CVD systems
   Sputtering systems
(6) Diffusion and Ion Implantation Systems
   Oxidation and diffusion systems
   Ion implantation systems The molded article of the invention exhibits excellent performance as a seal of, for example, a CVD system, plasma etching system, reactive ion etching system, asking system, or excimer laser exposure system.

EXAMPLES

The invention is described hereinbelow with reference to, but not limited to, examples.

Synthesis Example 1

In an inert gas atmosphere, a reaction container was charged with 0.312 g of sodium hydroxide, 1.00 mL of pure water, and 2.50 mL of DMF, and the components were stirred. Then, a solution mixture of 1.39 g of 3,5-dibromobenzenethiol (1) and 7.10 mL of distilled DMF was dropwise added slowly. Completion of the dropwise addition was followed by stirring at room temperature for one hour. Then, a solution mixture of 1.68 mL of perfluorohexyl iodide and 2.20 mL of distilled DMF was dropwise added, and the components were stirred at room temperature for 16 hours.

Completion of the reaction was followed by extraction with diethyl ether and washing of the extract with pure water. The product was dehydrated over anhydrous magnesium sulfate and filtered, and the solvent was evaporated under reduced pressure. A variety of purification operations were performed for isolation, whereby 3,5-dibromo-1-perfluorohexylsulfanyl benzene (2a) was obtained in the form of colorless transparent liquid. The actual yield was 2.45 g and the percent yield was 80.5%.

The structure of 3,5-dibromo-1-perfluorohexylsulfanyl benzene (2a) was confirmed by $^1$H-NMR, $^{19}$F-NMR, and FT-IR.

$^1$H-NMR (400 MHz, TMS in $CDCl_3$): δ7.76 (s, 2H, phenyl protons), 7.82 (s, 1H, phenyl proton)

$^{19}$F-NMR (400 MHz, Benzotrifluoride in $CDCl_3$): δ−81.7 (t, J=2.50 Hz, 3F, —$CF_3$), −87.0 (m, 2F, —S—$CF_2$—), −120.0 (m, 2F, —$CF_2$—), −122.3 (m, 2F, —$CF_2$—), −123.7 (m, 2F, —$CF_2$—), −127.0 (m, 2F, -$CF_2$—)

FT-IR: Disappearance of the absorption band at 2550 $cm^{-1}$ assigned to −SH was confirmed.

Synthesis Example 2

In an inert gas atmosphere, a reaction container was charged with 0.451 g (18.8 mmol) of magnesium, 1.81 g of chlorodimethylsilane, 3.90 mL of THF, and a grain of iodine, and the components were stirred. A solution mixture of 1.83 g of 3,5-dibromo-1-perfluorohexylsulfanyl benzene (2a) and 3.90 mL of THF was dropwise added, and the components were refluxed at 80° C. for 12 hours.

Completion of the reaction was followed by pouring of the mixture into dilute hydrochloric acid water, thereby stopping the reaction. A variety of purification operations were performed for isolation, whereby 3,5-dimethylsilyl-1-perfluorohexylsulfanyl benzene (3a) was obtained in the form of colorless transparent liquid. The actual yield was 0.779 g and the percent yield was 45.8%.

The structure of 3,5-dimethylsilyl-1-perfluorohexylsulfanyl benzene (3a) was confirmed by $^1$H-NMR, $^{19}$F-NMR, and FT-IR.

$^1$H-NMR (400 MHz, TMS in $CDCl_3$): δ0.38 (m, 12H, dimethyl silyl protons), 4.45 (m, 2H, silyl protons), 7.78 (s, 3H, phenyl protons)

$^{19}$F-NMR (400 MHz, Benzotrifluoride in $CDCl_3$): δ−81.7 (t, J=2.50 Hz, 3F, —$CF_3$), −87.5 (m, 2F, —S—$CF_2$—), −120.2 (m, 2F, —$CF_2$—), −122.3 (m, 2F, —$CF_2$—), −123.7 (m, 2F, —$CF_2$—), −127.1 (m, 2F, —$CF_2$—)

FT-IR: The presence of the absorption bands at 1250 $cm^{-1}$ and 2140 $cm^{-1}$ assigned to a dimethyl silyl group were confirmed.

Synthesis Example 3

A reaction container was charged with 1.10 mL of THF, 0.0711 mL of $H_2O$, and 0.0360 g of 5% Pd/C, and the components were stirred. A solution mixture of 0.359 g of 3,5-dimethylsilyl-1-perfluorohexylsulfanyl benzene (3a) and 1.10 mL of THF were dropwise added, and the components were stirred at room temperature for four hours.

A variety of purification operations were performed on the reaction mixture, whereby 3,5-dimethylhydroxysilyl-1-perfluorohexylsulfanyl benzene (M1a) was obtained in the form of white crystal. The actual yield was 0.254 g and the percent yield was 66.9%.

The structure of 3,5-dimethylhydroxysilyl-1-perfluorohexylsulfanyl benzene (M1a) was confirmed by $^1$H-NMR, $^{19}$F-NMR, and FT-IR.

$^1$H-NMR (400 MHz, TMS in $CDCl_3$): δ0.43 (s, 12H, dimethyl silyl protons), 2.21 (s, 2H, hydroxyl protons), 7.85 (s, 2H, phenyl protons), 7.93 (s, 1H, phenyl proton)

$^{19}$F-NMR (400 MHz, Benzotrifluoride in $CDCl_3$): δ−81.7 (t, J=2.55 Hz, 3F, —$CF_3$), −87.4 (m, 2F, —S—$CF_2$—), −120.1 (m, 2F, —$CF_2$—), −122.3 (m, 2F, —$CF_2$—), −123.7 (m, 2F, —$CF_2$—), −127.1 (m, 2F, —$CF_2$—)

FT-IR: Disappearance of the absorption band at 2140 cm$^{-1}$ assigned to a dimethyl silyl group and the presence of the absorption band at 3300 cm$^{-1}$ assigned to a hydroxy group were confirmed.

Synthesis Example 4

A reaction container was charged with 2.40 g of 3,5-dimethylhydroxysilyl-1-perfluorohexylsulfanyl benzene (M1a) and 8.30 mL of benzene, and the components were stirred. A spatula of 1,1,3,3-tetramethylguanidinium-2-ethylhexanoate (mixture of 1,1,3,3-tetramethylguanidine:2-ethylhexanoic acid=1:1 mol) was added, and the components were stirred at 100° C. for 24 hours.

A variety of purification operations were performed on the reaction solution, whereby poly[5-(perfluorohexylsulfanyl) tetramethyl-1,3-silphenylenesiloxane] (P1a) was obtained in the form of light yellow solid. The actual yield was 1.34 g and the percent yield was 55.8%.

The structure of poly[5-(perfluorohexylsulfanyl)tetramethyl-1,3-silphenylenesiloxane] (P1a) was confirmed by $^1$H-NMR, $^{19}$F-NMR, FT-IR, and GPC.

$^1$H-NMR (400 MHz, TMS in CDCl$_3$): δ0.29 (s, 12H, dimethyl silyl protons), 7.75 (s, 3H, phenyl protons)

$^{19}$F-NMR (400 MHz, Benzotrifluoride in CDCl$_3$): δ−82.1 (t, J=2.55 Hz, 3F, —CF$_3$), −87.7 (m, 2F, —S—CF$_2$—), −120.4 (m, 2F, —CF$_2$—), −122.6 (m, 2F, —CF$_2$—), −124.0 (m, 2F, —CF$_2$—), −127.4 (m, 2F, —CF$_2$—)

FT-IR: Disappearance of the absorption band at 3300 cm$^{-1}$ assigned to a hydroxy group and the presence of the absorption band at 1080 cm$^{-1}$ assigned to Si—O—Si were confirmed.

GPC: No polymer was detected by an RI detector. Thus, the measurement was performed by GPC using a UV detector. The polymer had a number average molecular weight of 1.1×10$^5$.

Synthesis Example 5

A reaction container was charged with 2.36 g of 3,5-dimethylhydroxysilyl-1-perfluorobutylethylsulfanyl benzene (M1b) and 9.40 mL of benzene, and the components were stirred. A spatula of 1,1,3,3-tetramethylguanidinium-2-ethylhexanoate (mixture of 1,1,3,3-tetramethylguanidine:2-ethylhexanoic acid=1:1 mol) was added, and the components were stirred at 100° C. for 24 hours.

A small amount of chloroform was added to the reaction solution. The mixture was poured into methanol and reprecipitation was performed three times. Thereby, poly(3,5-dimethylhydroxysilyl-1-perfluorobutylethylsulfanyl benzene) (P1b) was obtained in the form of reddish-brown viscous liquid. The actual yield was 0.764 g and the percent yield was 32.2%.

The structure of poly(3,5-dimethylhydroxysilyl-1-perfluorobutylethylsulfanyl benzene) (P1b) was confirmed by $^1$H-NMR, $^{19}$F-NMR, FT-IR, and GPC.

$^1$H-NMR (400 MHz, TMS in CDCl$_3$): δ0.30 (s, 12H, dimethyl silyl protons), 2.36 (m, 2H, ethyl protons), 3.07 (m, 2H, ethyl protons), 7.51 (s, 2H, phenyl protons), 7.57 (s, 1H, phenyl proton)

$^{19}$F-NMR (400 MHz, Benzotrifluoride in CDCl$_3$): δ−82.2 (t, J=2.90 Hz, 3F, —CF$_3$), −115.5 (m, 2F, —CF$_2$—), −125.4 (m, 2F, —CF$_2$—), −127.1 (m, 2F, —CH$_2$—CF$_2$—)

FT-IR: Disappearance of the absorption band at 3300 cm$^{-1}$ assigned to a hydroxy group and the presence of the absorption band at 1080 cm$^{-1}$ assigned to Si—O—Si were confirmed.

GPC: The polymer had a number average molecular weight of 8.9×10$^5$.

Synthesis Example 6

In an inert gas atmosphere, a reaction container was charged with 60.0 mL of dimethyl acetamide, 10.2 mL of 2-propanethiol, and 2.53 g of sodium, and the components were stirred. Then, 4.80 g of 1,4-bromobenzene was added, and the components were stirred at 100° C. for 16 hours. Next, 4.37 g of sodium was added, and the components were stirred at 100° C. for 20 hours.

Completion of the reaction was followed by addition of 250 mL of pure water and 25 mL of hydrochloric acid, thereby stopping the reaction. A variety of purification operations were performed on the reaction mixture, whereby 1,4-benzenedithiol (4) was obtained in the form of light yellow solid. The actual yield was 1.58 g and the percent yield was 55.5%.

The structure of 1,4-benzenedithiol (4) was confirmed by $^1$H-NMR, $^{13}$C-NMR, and FT-IR.

$^1$H-NMR (400 MHz, TMS in CDCl$_3$): −3.41 (s, 2H, thiol protons), 7.16 (s, 4H, phenyl protons)

$^{13}$C-NMR (100 MHz, TMS in CDCl$_3$): δ128.1 (phenyl carbon), 130.5 (phenyl carbon)

FT-IR: The presence of the absorption band at 2550 cm$^{-1}$ assigned to —SH was confirmed.

Synthesis Example 7

In an inert gas atmosphere, a reaction container was charged with 1.10 g of sodium hydroxide, 2.00 mL of pure water, and 5.20 mL of DMF, and the components were stirred. A solution mixture of 1.57 g of 1,4-benzenedithiol (4) and 16.0 mL of DMF were dropwise added slowly. Completion of the dropwise addition was followed by stirring at room temperature for one hour. A solution mixture of 5.30 mL of perfluorobutyl ethyl iodide and 4.30 mL of DMF was dropwise added, and the components were stirred for 16 hours.

Completion of the reaction was followed by a variety of purification operations for isolation of the target product. Thereby, 1,4-diperfluorobutylethylsulfanyl benzene (5b) was obtained in the form of white crystal. The actual yield was 5.38 g and the percent yield was 77.1%.

The structure of 1,4-diperfluorobutylethylsulfanyl benzene (5b) was confirmed by $^1$H-NMR, $^{19}$F-NMR, and FT-IR.

$^1$H-NMR (400 MHz, TMS in CDCl$_3$): δ2.38 (m, 4H, ethyl protons), 3.11 (m, 4H, ethyl protons), 7.32 (s, 4H, phenyl protons)

$^{19}$F-NMR (400 MHz, Benzotrifluoride in CDCl$_3$): δ−82.0 (t, J=6.15 Hz, 6F, —CF$_3$), −115.4 (m, 4F, —CH$_2$—CF$_2$—), −125.3 (m, 4F, —CF$_2$—), −127.0 (m, 4F, —CF$_2$—)

FT-IR: Disappearance of the absorption band at 2550 cm$^{-1}$ assigned to -SH was confirmed.

Synthesis Example 8

In an inert gas atmosphere, a reaction container was charged with 3.79 g of 1,4-diperfluorobutylethylsulfanyl benzene (5b), 22.1 mL of dichloromethane, and a grain of iodine, and the components were stirred. The reaction container was shielded from light, and 6.49 mL of bromine was dropwise added under ice cooling. Completion of the dropwise addition was followed by stirring at room temperature for 72 hours.

Completion of the reaction was followed by pouring of the mixture into a sodium thiosulfate aqueous solution, thereby stopping the reaction. A variety of purification operations were performed on the reaction mixture for isolation, whereby 2,5-dibromo-1,4-bis-perfluorobutylethylsulfanyl benzene (6b) was obtained in the form of white crystal. The actual yield was 3.71 g and the percent yield was 78.4%.

The structure of 2,5-dibromo-1,4-bis-perfluorobutylethylsulfanyl benzene (6b) was confirmed by $^1$H-NMR and $^{19}$F-NMR.

$^1$H-NMR (400 MHz, TMS in CDCl$_3$): δ2.45 (m, 4H, ethyl protons), 3.15 (m, 4H, ethyl protons), 7.46 (s, 2H, phenyl protons)

$^{19}$F-NMR (400 MHz, Benzotrifluoride in CDCl$_3$): δ−82.0 (t, J=3.05 Hz, 6F, —CF$_3$), −115.2 (m, 4F, —CH$_2$—CF$_2$—), −125.2 (m, 4F, —CF$_2$—), −127.0 (m, 4F, —CF$_2$—)

Synthesis Example 9

In an inert gas atmosphere, a reaction container was charged with 0.355 g of magnesium, 1.41 g of chlorodimethylsilane, 3.30 mL of THF, and a grain of iodine, and the components were stirred. A solution mixture of 1.93 g of 2,5-dibromo-1,4-bis-perfluorobutylethylsulfanyl benzene (6b) and 3.10 mL of THF was dropwise added, and the components were refluxed for 12 hours.

Completion of the reaction was followed by pouring of the mixture into dilute hydrochloric acid water. A variety of purification operations were performed on the reaction mixture for isolation, whereby 2,5-dimethylsilyl-1,4-bis-perfluorobutylethylsulfanyl benzene (7b) was obtained in the form of white solid. The actual yield was 0.938 g and the percent yield was 51.2%.

The structure of 2,5-dimethylsilyl-1,4-bis-perfluorobutylethylsulfanyl benzene (7b) was confirmed by $^1$H-NMR, $^{19}$F-NMR, and FT-IR.

$^1$H-NMR (400 MHz, CDCl$_3$): δ0.41 (s, 12H, dimethyl silyl protons), 2.39 (m, 4H, ethyl protons), 3.12 (m, 4H, ethyl protons), 4.54 (m, 2H, silyl protons), 7.50 (s, 2H, phenyl protons)

$^{19}$F-NMR (400 MHz, Benzotrifluoride in CDCl$_3$): δ−82.0 (t, J=3.10 Hz, 6F, —CF$_3$), −115.4 (m, 4F, —CH$_2$—CF$_2$—), −125.4 (m, 4F, —CF$_2$—), −127.1 (m, 4F, —CF$_2$—)

FT-IR: The presence of the absorption bands at 1250 cm$^{-1}$ and 2140 cm$^{-1}$ assigned to a dimethyl silyl group were confirmed.

Synthesis Example 10

A reaction container was charged with 1.70 mL of THF, 0.110 mL of H$_2$O, and 0.100 g of 5% Pd/C, and the components were stirred. A solution mixture of 0.767 g of 2,5-dimethylsilyl-1,4-bis-perfluorobutylethylsulfanyl benzene (7b) and 1.70 mL of THF was dropwise added, and the components were stirred at room temperature for four hours.

A variety of purification operations were performed on the reaction mixture, whereby 2,5-dimethylhydroxysilyl-1,4-bis-perfluorobutylethylsulfanyl benzene (M2b) was obtained in the form of white solid. The actual yield was 0.684 g and the percent yield was 85.7%.

The structure of 2,5-dimethylhydroxysilyl-1,4-bis-perfluorobutylethylsulfanyl benzene (M2b) was confirmed by $^1$H-NMR, $^{19}$F-NMR, and FT-IR.

$^1$H-NMR (400 MHz, CDCl$_3$): δ0.48 (s, 12H, dimethyl silyl protons), 1.80 (s, 2H, hydroxyl protons), 2.41 (m, 4H, ethyl protons), 3.16 (m, 4H, ethyl protons), 7.59 (s, 2H, phenyl protons)

$^{19}$F-NMR (400 MHz, Benzotrifluoride in CDCl$_3$): δ−82.0 (t, J=3.10 Hz, 6F, —CF$_3$), −115.4 (m, 4F, —CH$_2$—CF$_2$—), −125.3 (m, 4F, —CF$_2$—), −127.0 (m, 4F, —CF$_2$—)

FT-IR: Disappearance of the absorption band at 2140 cm$^{-1}$ assigned to a dimethylsilyl group (Si—(CH$_3$)$_2$H) and the presence of the absorption band at 3300 cm$^{-1}$ assigned to a hydroxy group were confirmed.

Synthesis Example 11

A reaction container was charged with 0.589 g of 2,5-dimethylhydroxysilyl-1,4-bis-perfluorobutylethylsulfanyl benzene (M2b) and 2.50 mL of benzene, and the components were stirred. A spatula of 1,1,3,3-tetramethylguanidinium-2-ethylhexanoate (a mixture of 1,1,3,3-tetramethylguanidine: 2-ethylhexanoic acid=1:1 mol) was added, and the components were refluxed and stirred for 24 hours.

A variety of purification operations were performed on the reaction solution, whereby poly[2,5-(perfluorobutylethylsulfanyl)tetramethyl-1,4-silphenylenesiloxane] (P2b) was obtained in the form of white solid. The actual yield was 0.510 g and the percent yield was 86.6%.

The structure of poly[2,5-(perfluorobutylethylsulfanyl) tetramethyl-1,4-silphenylenesiloxane] (P2b) was confirmed by $^1$H-NMR, $^{19}$F-NMR, FT-IR, and GPC.

$^1$H-NMR (400 MHz, CDCl$_3$): δ0.46 (s, 12H, dimethyl silyl protons), 2.28 (m, 4H, ethyl protons), 3.02 (m, 4H, ethyl protons), 7.66 (s, 2H, phenyl protons)

$^{19}$F-NMR (400 MHz, Benzotrifluoride in CDCl$_3$): δ−82.8 (m, 6F, —CF$_3$), −116.0 (m, 4F, —CF$_2$—), −125.9 (m, 4F, —CF$_2$—), −127.7 (m, 4F, —CH$_2$—CF$_2$—)

FT-IR: Disappearance of the absorption band at 3300 cm$^{-1}$ assigned to a hydroxy group and the presence of the absorption band at 1080 cm$^{-1}$ assigned to Si—O—Si were confirmed.

GPC: The polymer had a number average molecular weight of $2.1 \times 10^5$.

Synthesis Example 12

A two-neck flask was charged with 0.44 mL of distilled THF, 0.284 mL (1.580 mmol) of H$_2$O, and 0.0200 g of 5% Pd/C, and the components were stirred. A solution mixture of 0.250 g (0.263 mmol) of 2,5-dimethlysilyl-1,4-bis-perfluorohexylethylsulfanyl benzene (7c) and 0.44 mL of distilled THF was dropwise added, and the components were stirred at room temperature for four hours.

The product was filtered through celite to remove 5% Pd/C, and the solvent in the filtrate was evaporated under reduced pressure. The product was subjected to silica gel column chromatography (developing solvent: ethyl acetate: hexane=1:5, Rf value=0.38) for isolation. The product was then recrystallized with hexane, whereby white crystal (M2c) was obtained. The actual yield was 0.207 g and the percent yield was 80%.

The structure of 2,5-dimethlyhydroxysilyl-1,4-bis-perfluorohexylethylsulfanyl benzene (M2c) was confirmed by $^1$H-NMR, $^{13}$C-NMR, $^{19}$F-NMR, and FT-IR.

$^1$H-NMR (400 MHz, CDCl$_3$): δ0.48 (s, 12H, dimethyl silyl protons), 2.41 (tt, J=8.45 Hz, 26.1 Hz, 4H, ethyl protons), 3.16 (m, 4H, ethyl protons), 7.59 (s, 2H, phenyl protons)

$^{13}$C-NMR (100 MHz, CDCl$_3$): δ1.11 (dimethyl silyl carbons), 26.4 (ethyl carbons), 31.5 (ethyl carbons), 136.9 (phenyl carbons), 138.3 (phenyl carbons), 144.8 (phenyl carbons)

$^{19}$F-NMR (376 MHz, CDCl$_3$): δ−81.8 (tt, J=1.1 Hz, 10.1 Hz, 6F, —CF$_3$), −115.2 (m, 4F, —CH$_2$—CF$_2$—), −122.9 (s, 4F, —CF$_2$—), −123.9 (s, 4F, —CF$_2$—), −124.4 (d, J=12.7 Hz, 4F, —CF$_2$—), −127.2 (m, 4F, —CF$_2$—)

FT-IR: Disappearance of the absorption band at 2140 cm$^{-1}$ assigned to a dimethylsilyl group (Si—(CH$_3$)$_2$H) and the presence of the absorption band at 3300 cm$^{-1}$ assigned to a hydroxy group were confirmed.

Synthesis Example 13

A recovery flask was charged with 0.740 g (0.753 mmol) of (M2c) obtained in Synthesis Example 12 and 2.5 mL of benzene, and the components were stirred. A spatula of 1,1,3,3-tetramethylguanidinium-2-ethylhexanoate (a mixture of 1,1,3,3-tetramethylguanidine:2-ethylhexanoic acid=1:1 mol) was added, and the components were refluxed and stirred for 24 hours.

Completion of the reaction was followed by washing with methanol three times, whereby poly[2,5-(perfluorohexylethylsulfanyl)tetramethyl-1,4-silphenylenesiloxane] (P2c) was collected.

Example 1

Poly[2,5-(perfluorohexylethylsulfanyl)tetramethyl-1,4-silphenylenesiloxane] (P2c) obtained in Synthesis Example 13 was pressed at 100° C. for 10 minutes to provide a sheet. This sheet was cut with a snap-off cutter to provide a 5-mm-square sample. The sample was placed at the center of a RF electrode and subjected to plasma irradiation treatment under the following conditions. The weight of the sample was measured before and after the irradiation, and the weight reduction per unit area was examined. The result is shown in Table 1.

Plasma irradiation device: high density plasma ICP etching system, MODEL RIE-101iPH, available from Samco Inc.

Plasma Irradiation Conditions:
  Gas: oxygen
  Amount of gas flow: 16 sccm
  RF output: 400 W
  Pressure: 2.66 Pa
  Etching duration: 60 minutes Measurement of Amount of Material Etched:

The weight of the sample was measured to the 0.01-mg place using an electron balance BP211D available from Sartorius GMBH, and the figure at the 0.01-mg place was rounded.

Comparative Example 1

Carbon black Thermax N990 available from Cancarb was formed into a 7-mm-diameter tablet using a tableting machine. Except that this tablet was used as a test sample, plasma irradiation was performed and the weight was measured before and after the irradiation, and the weight reduction per unit area was examined in the same manner as in Example 1. The result is shown in Table 1.

TABLE 1

|  | Example 1 | Comparative Example 1 |
| --- | --- | --- |
| Weight reduction (g/m$^2$) | 34 | 420 |

Example 2

A 5-mm-square sample of poly[2,5-(perfluorohexylethylsulfanyl)tetramethyl-1,4-silphenylenesiloxane] (P2c) was produced in the same manner as in Example 1. This sample was placed at the center of a RF electrode and subjected to plasma irradiation treatment under the following conditions. The weight was measured before and after the irradiation, and the weight reduction per unit area was examined. The result is shown in Table 2.

Plasma Irradiation Conditions:
  Gas: CF$_4$
  Amount of gas flow: 16 sccm
  RF output: 400 W
  Pressure: 2.66 Pa
  Etching duration: 60 minutes Comparative Example 2

Silica Aerosil 50 available from Nippon Aerosil Co., Ltd. was formed into a 7-mm-diameter tablet using a tableting machine. Except that this tablet was used as a test sample, plasma irradiation was performed and the weight was measured before and after the irradiation, and the weight reduction per unit area was examined in the same manner as in Example 2. The result is shown in Table 2.

TABLE 2

|  | Example 2 | Comparative Example 2 |
| --- | --- | --- |
| Weight reduction (g/m$^2$) | 16 | 92 |

Example 3

First, 100 parts by mass of a fluorine-containing elastomer (TFE/PMVE/cyano group-containing monomer=59.4/40.1/0.5 (mole ratio)), 10 parts by mass of poly[2,5-(perfluorohexylethylsulfanyl)tetramethyl-1,4-silphenylenesiloxane] (P2c) obtained in Synthesis Example 13, and 0.8 parts by mass of a cross-linking agent 2,2-bis[3-amino-4-(N-phenylamino)phenyl]hexafluoropropane were pre-mixed in 1500 parts by mass of a fluorine-containing solvent. Then, the fluorine-containing solvent was evaporated at 60° C. and the residue was kneaded using an open roll mill. Thereby, a fluorine-containing elastomer composition was obtained. The fluorine-containing solvent used was R-318 (available from Daikin Industries, Ltd., main component: C$_4$F$_8$Cl$_2$).

The resulting fluorine-containing elastomer composition was press-crosslinked at 180° C. for 30 minutes, and then oven-crosslinked in a 290° C. oven over 18 hours. Thereby, a molded article was obtained.

The resulting molded article was subjected to the plasma resistance evaluation to be described later. The results of plasma resistance evaluation are shown in Table 3.

Comparative Example 3

A fluorine-containing elastomer composition was obtained in the same manner as in Example 3, except that poly[2,5-(perfluorohexylethylsulfanyl)tetramethyl-1,4-silphenylenesiloxane] (P2c) in Example 1 was not added. A molded article was obtained from the fluorine-containing elastomer composition in the same manner as in Example 3. The resulting molded article was subjected to the plasma resistance evaluation to be described later. The results of plasma resistance evaluation are shown in Table 3.

(Plasma Resistance Evaluation)

Each of the molded articles obtained in Example 3 and Comparative Example 3 was partially covered with an electrically insulating Kapton tape, and then subjected to plasma irradiation under the following conditions. The step between the covered surface and the exposed surface was measured to determine the amount of the material etched. The results are shown in Table 3.

Plasma Irradiation Conditions:
  Gases: oxygen, $CF_4$
  Amount of gas flow: 16 sccm
  RF output: 400 W
  Pressure: 2.66 Pa
  Etching duration: 30 minutes Measurement of Amount of Material Etched:

The step between the covered surface and the exposed surface was measured using a laser scanning microscope VK-9700 available from Keyence Corp. to determine the amount of the material etched.

TABLE 3

|  |  | Example 3 | Comparative Example 3 |
|---|---|---|---|
| Composition (parts by mass) | Fluorine-containing elastomer | 100 | 100 |
|  | Cross-linking agent | 0.8 | 0.8 |
|  | P2c | 10 | 0 |
| Amount of material etched (nm) | Oxygen plasma | 14300 | 31900 |
|  | $CF_4$ plasma | 4300 | 8400 |

Example 4

First, 100 parts by mass of a fluorine-containing elastomer (TFE/PMVE=60/40 (mole ratio)) and 10 parts by mass of poly[2,5-(perfluorohexylethylsulfanyl)tetramethyl-1,4-silphenylenesiloxane] (P2c) obtained in Synthesis Example 13 were pre-mixed in 1500 parts by mass of a fluorine-containing solvent. Then, the fluorine-containing solvent was evaporated at 60° C. and the residue was kneaded using an open roll mill. Thereby, a fluorine-containing elastomer composition was obtained. The fluorine-containing solvent used was R-318 (available from Daikin Industries, Ltd., main component: $C_4F_8Cl_2$).

The resulting fluorine-containing elastomer composition was press-molded at 85° C. over 10 minutes. The resulting molded article was subjected to the 50% mass reduction temperature measurement to be described later. The measurement result is shown in Table 4.

Comparative Example 4

A fluorine-containing elastomer composition was obtained in the same manner as in Example 4, except that poly[2,5-(perfluorohexylethylsulfanyl)tetramethyl-1,4-silphenylenesiloxane] (P2c) obtained in Synthesis Example 13 was not mixed. A molded article was obtained from the fluorine-containing elastomer composition in the same manner as in Example 4. The resulting molded article was subjected to the 50% mass reduction temperature measurement to be described later. The measurement result is shown in Table 4.

(50% Mass Reduction Temperature)

The mass change was measured at an air of 200 ml/min and a heating rate of 10° C./min, and within a temperature range of 20° C. to 600° C. using a simultaneous thermogravimetric analyzer (TG-DTA6200, available from Seiko Instruments Inc.) to determine the temperature at which the mass was reduced by 50%. The results are shown in Table 4.

TABLE 4

|  |  | Example 4 | Comparative Example 4 |
|---|---|---|---|
| Composition (Parts by mass) | Fluorine-containing elastomer | 100 | 100 |
|  | P2c | 10 | 0 |
| 50% mass reduction temperature (° C.) |  | 471 | 457 |

The invention claimed is:

1. A polymer comprising a constitutional unit represented by the following formula (1):

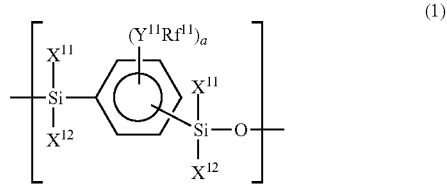

wherein $X^{11}$ and $X^{12}$ are the same as or different from each other, and are each a hydrogen atom, an alkyl group optionally containing a fluorine atom, or a phenyl group; $Y^{11}$ is an oxygen atom or a sulfur atom; $Rf^{11}$ is $-(CF_2)_nCF_3$ (wherein n is an integer of 0 or greater) or $-(CH_2)_2(CF_2)_nCF_3$ (wherein n is an integer of 0 or greater); and a is an integer of 1 to 4.

2. The polymer according to claim 1,
  wherein in the formula (1), a first Si binding to a benzene ring is present at a para position relative to a second Si.

3. The polymer according to claim 1,
  wherein the polymer has a number average molecular weight of $0.5 \times 10^3$ to $1.0 \times 10^7$.

4. A composition comprising
  a fluorine-containing polymer and a polymer comprising a constitutional unit represented by the following formula (1):

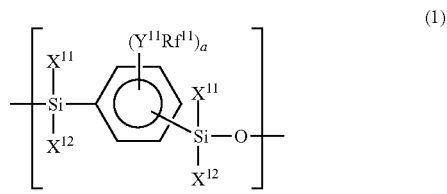

wherein $X^{11}$ and $X^{12}$ are the same as or different from each other, and are each a hydrogen atom, an alkyl group optionally containing a fluorine atom, or a phenyl group; $Y^{11}$ is an oxygen atom or a sulfur atom; $Rf^{11}$ is a hydrogen atom or an alkyl group optionally containing a fluorine atom; and a is an integer of 1 to 4.

5. The composition according to claim 4,
wherein the fluorine-containing polymer is a fluorine-containing elastomer.

6. The composition according to claim 5,
wherein the fluorine-containing elastomer is a perfluoroelastomer containing TFE.

7. The composition according to claim 6,
wherein the perfluoroelastomer containing TFE is at least one selected from the group consisting of a copolymer of TFE and a fluoromonomer represented by the following formula (8), (10), or (11) and a copolymer of TFE, a fluoromonomer represented by the following formula (8), (10), or (11), and a monomer giving a crosslinking site,
the formula (8) is $CF_2=CF-ORf^{81}$, wherein $Rf^{81}$ is a C1-C8 perfluoroalkyl group;
the formula (10) is $CF_2=CFOCF_2ORf^{101}$, wherein $Rf^{101}$ is a C1-C6 linear or branched perfluoroalkyl group, a C5-C6 cyclic perfluoroalkyl group, or a C2-C6 linear or branched perfluorooxyalkyl group containing 1 to 3 oxygen atoms; and
the formula (11) is $CF_2=CFO(CF_2CF(Y^{111})O)_m(CF_2)_nF$, wherein $Y^{111}$ is a fluorine atom or a trifluoromethyl group; m is an integer of 1 to 4; and n is an integer of 1 to 4.

8. The composition according to claim 6,
wherein TFE in the perfluoroelastomer containing TFE represents 45 mol % or more of all monomers.

9. The composition according to claim 4,
wherein the fluorine-containing polymer contains a cyano group.

10. The composition according to claim 4,
wherein the composition contains 0.5 to 100 parts by mass of the polymer relative to 100 parts by mass of the fluorine-containing polymer.

11. The composition according to claim 4,
wherein the composition is a molding material.

12. A molded article obtained from the composition according to claim 4.

13. The molded article according to claim 12,
wherein the molded article is a seal.

14. The molded article according to claim 12,
wherein the molded article is a seal for a semiconductor manufacturing device.

15. The composition according to claim 4,
wherein in the formula (1), a first Si binding to a benzene ring is present at a para position relative to a second Si.

16. The composition according to claim 4,
wherein the polymer has a number average molecular weight of $0.5 \times 10^3$ to $1.0 \times 10^7$.

* * * * *